Jan. 14, 1958 C. H. BRACKETT 2,819,900
CALF-ROPING AMUSEMENT DEVICE
Filed Oct. 3, 1955 2 Sheets-Sheet 1
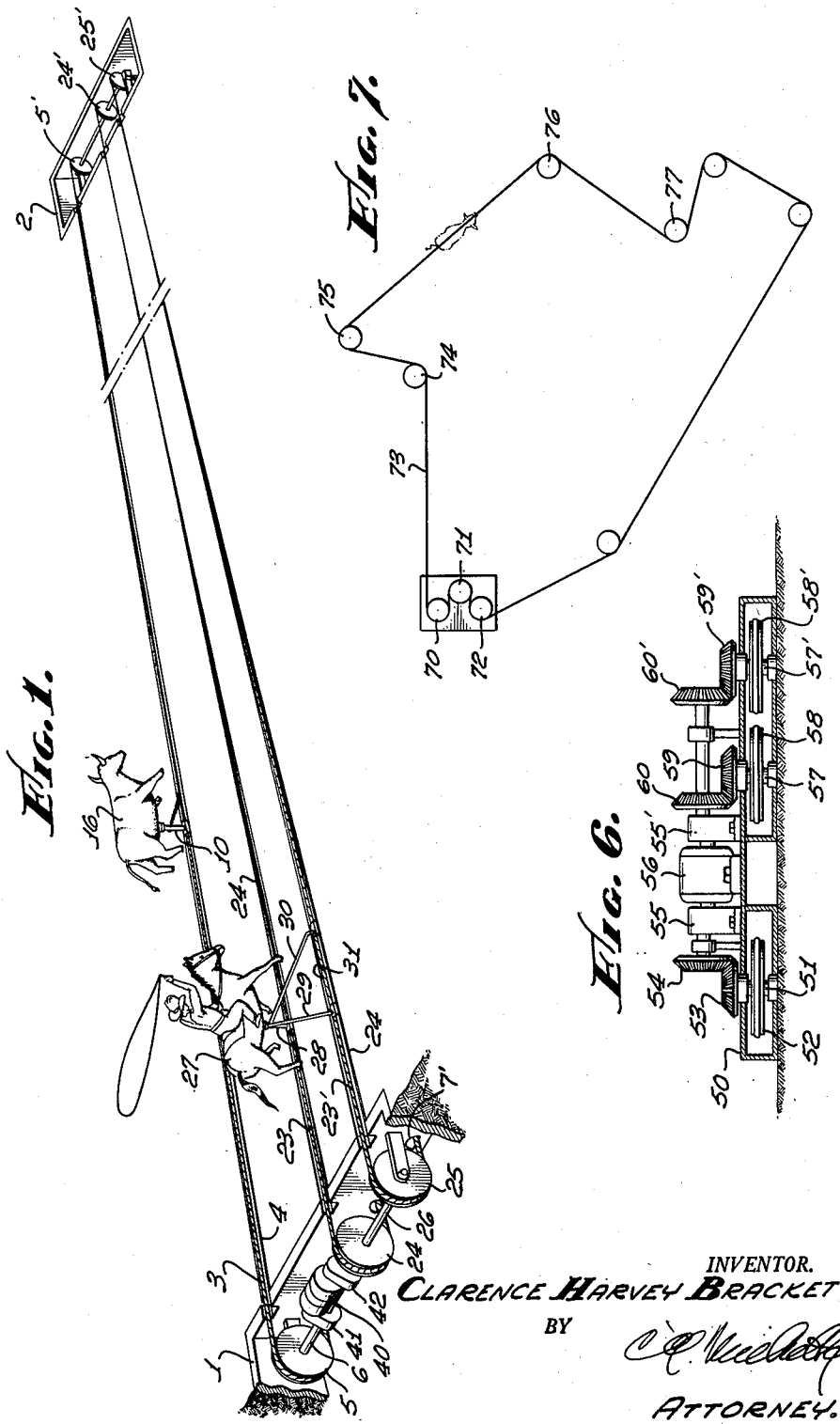
INVENTOR.
CLARENCE HARVEY BRACKETT
BY
ATTORNEY.

Jan. 14, 1958 C. H. BRACKETT 2,819,900
CALF-ROPING AMUSEMENT DEVICE
Filed Oct. 3, 1955 2 Sheets-Sheet 2
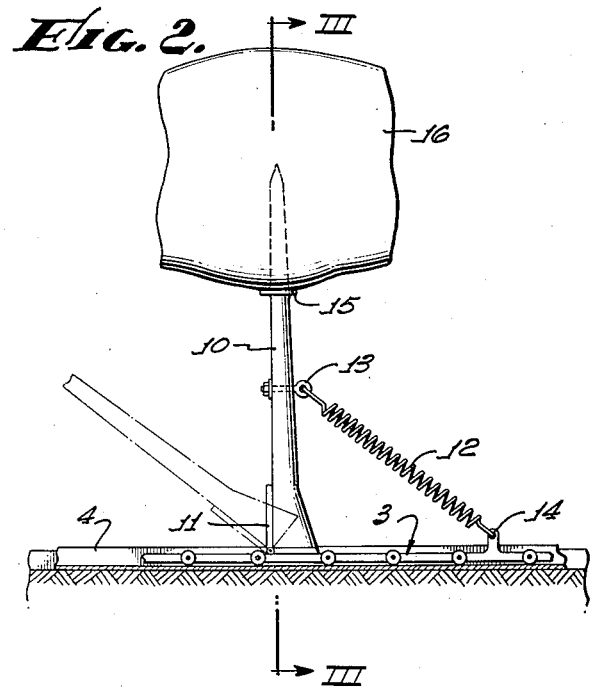
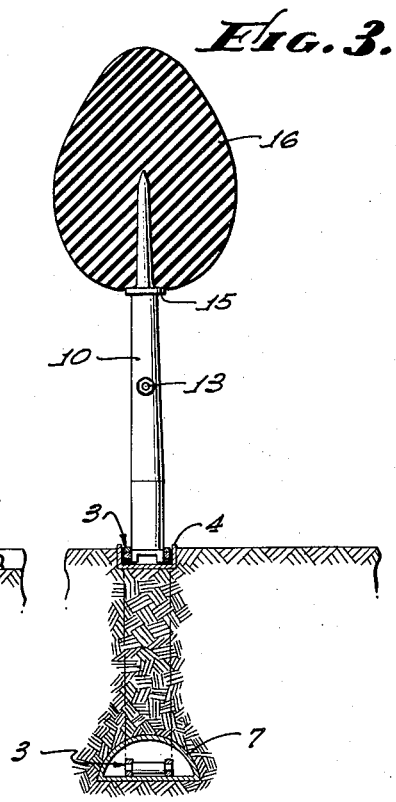
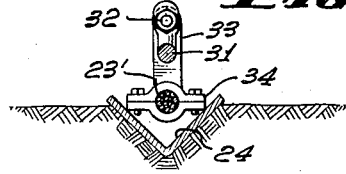
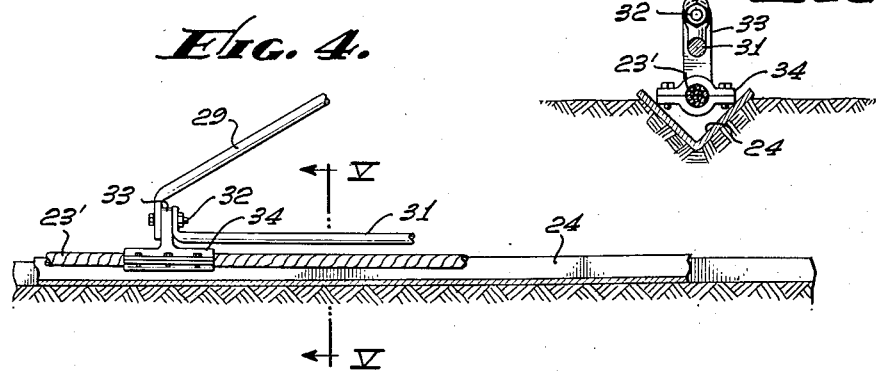
INVENTOR.
CLARENCE HARVEY BRACKETT
BY
ATTORNEY.

United States Patent Office 2,819,900
Patented Jan. 14, 1958

2,819,900
CALF-ROPING AMUSEMENT DEVICE
Clarence Harvey Brackett, Woodland, Calif.
Application October 3, 1955, Serial No. 538,000
4 Claims. (Cl. 273—1)

This invention relates to a device for the amusement or instruction of persons in the art of roping cattle. The invention particularly relates to a novel combination of elements whereby persons may experience riding after a steer or calf and roping such animal in a realistic manner, whether for purposes of amusement or for purposes of training in the art of roping cattle.

Generally stated, the devices of the present invention contemplate the use of continuous conveyors arranged on the surface of the ground, one of said conveyors being provided with a support for a representation of an animal to be roped (hereinafter referred to as a cattle), the other conveyor carrying a representation of a horse which is adapted to be mounted by and supporting a human being. Driving means are provided whereby these two conveyors may be driven at any desired speed in the same direction, the rider on the horse then experiencing all of the impressions of actually running down an animal and roping it. The representation of the animal being roped is preferably made of a resilient composition or materials and is so mounted upon its support that after it is roped the animal will be removed from its support and fall in a realistic manner, permitting the trainee to again experience the occasion in substantially the same manner as on the open range.

It is an object of the present invention, therefore, to disclose and provide a device for amusement and instruction in cattle roping.

A further object of the invention is to disclose and provide an amusement and instruction device which may be readily installed on any suitable plot of ground and provide both amusement and instruction in cattle roping.

A still further object of the invention is to provide means whereby a representation of a cattle and a reprsentation of a horse capable of carrying a human being may be controllably driven over a predetermined course, the speed of the cattle being variable with respect to the representation of the horse to thereby impart realism to the resulting action.

Moreover, the invention contemplates means and methods for supporting and moving a representation of a cattle so as to permit such representation to be chased, roped and thrown in a realistic manner.

These and various other objects, uses and advantages of the invention will become apparent to those skilled in the art from the following description of an exemplary form and certain modifications, reference being had to the appended drawings for purposes of illustration.

In the drawings:

Fig. 1 is a perspective view, partly broken away, of an exemplary arrangement of elements.

Fig. 2 is a somewhat enlarged, side elevation of a portion of the cattle drive and support.

Fig. 3 is a transverse section taken along plane III—III in Fig. 2.

Fig. 4 is an enlarged side view of a support for a representation of a horse.

Fig. 5 is an end view and section taken along the plane V—V in Fig. 4.

Fig. 6 is an end view of a modified arrangement for driving the conveyors.

Fig. 7 is a plan view of a further modification.

Although the apparatus of the present invention may be embodied in numerous forms, as will appear hereafter, Fig. 1 illustrates a permanent installation particularly adapted for training purposes. As there shown, a pit having walls 1 is provided at one end of a plot of ground, the driving mechanism being mounted in such pit. Another pit having walls 2 is located at the far end of a suitable stretch of ground.

A continuous conveyor, such as a chain or cable 3, extends between pits 1 and 2, the upper lay of the conveyor being virtually at ground level. In the illustrated form of apparatus the upper lay of conveyor 3 is supported and guided within a channel iron 4 extending from pit 1 to pit 2. Within the pit 1 the conveyor 3 passes over a suitable wheel or sprocket 5 mounted upon shaft 6, the shaft being supported in suitable bearings, not shown. A similar sprocket or wheel 5' is also mounted upon a shaft rotatably supported within pit 2. The lower lay of the conveyor 3 may extend through a conduit 7, as illustrated in Fig. 3.

The conveyor 3 is provided with a support 10 hingedly connected to the conveyor as by means of a hinge 11 for movement about an axis substantially transverse to the direction of movement of the conveyor. Means are provided for normally biasing and holding the support in a vertical position and such means may comprise a spring 12, one end being attached to the support 10 as by means of an eye bolt 13 and the other end being attached to a fitting 14 which is a part of the conveyor 3. The base of the support 10 may be enlarged so as to provide a foot-resisting movement of the support 10 in the forward direction of the conveyor but permitting hinging of the support 10 in a rearward direction, as for example, into the position indicated by dash lines.

The support 10 may be provided with a pointed upper end and a horizontally disposed stop plate 15. A representation of a cattle 16 is impaled upon the support 10, such representation resting upon the stop plate 15. Preferably the representation 16 is made of a resilient material or combination of materials. For example, it can be made of rubber compositions (either hollow or solid); it may be of molded rubber; it may comprise an outer, relatively solid rubber, preformed element filled with cotton batting or the like; it may be reinforced with strips of resilient metal; it may have an exterior surface either painted to represent a steer, calf or the like, or it may be actually covered with the hide of the corresponding animal. At all events, the representation is preferably as realistic as possible and is of substantially the same weight and resiliency as a real animal. Such representation may be provided with a reinforced or other suitable socket into which the upper portion of the support 10 extends. The upper, pointed portion of the support 10 is preferably polygonal or rectangular in cross section so as to resist pivoting of the representation 16 upon such support.

A second, continuous conveying means having an upper lay virtually at ground level is positioned adjacent to the conveyor 3, this second conveying means extending in substantially parallel relation to the conveyor 3. In the form illustrated, this second, continuous conveying means may comprise cables 23 and 23', each having an upper lay extending in a channel or angle iron such as 24 (see Fig. 5). Lower lays of these two cables may extend through conduits such as 7' buried in the ground. Each of such cables passes over a suitable sheave or pulley such as the sheaves 24 and 25 mounted upon a common shaft 26 suitably journaled in the pit 1. The cables also pass over similar pulleys 24' and 25' mounted upon a suitable shaft in the further pit having walls 2. It will be understood that in this arrangement the cables 23 and 23' are driven at the same speed.

The continuous conveying means comprising such two cables 23 and 23' carries a representation of a horse 27 securely supported by a framework attached to the cables. Such framework may include a vertical post 28 carried by the cable 23 and an A frame extending from near the top of the post 28 and comprising legs 29 and 30, such legs being interconnected by means of a bar 31 adjacent the cable 23', the ends of the arms 29 and 30 and the ends of the bar 31 being firmly connected as by means of bolts 32 to an upstanding lug 33 of a cable clamp portion 34, such cable clamp being firmly connected to the cable 23'. The bottom of the supporting posts 28 may be an upstanding lug of a cable clamp similar to that illustrated in Fig. 4.

The representation of the horse 27 is three-dimensional and of a size adapted to support a human being. Such representation may be made of any suitable materials but is preferably provided with a saddle, reins, and other paraphernalia customarily found on cow ponies.

Means are provided for driving the conveyor 3 and the second conveying means 23—23' and for varying the relative speed of the conveying means and the conveyor. Such means comprise an electric or other motor 40, each end of said motor being connected to a multispeed, variable drive indicated at 41 and 42. Each of these infinitely variable drives is provided with a separate control. Variable drive 41 drives shaft 6, sprocket 5 and conveyor chain 3; variable speed device 42 now drives shaft 26, pulleys 24 and 25 and cables 23 and 23', respectively.

By means illustrated it will be evident that an operator may start cable 3 in order to give the cattle a running start and then permit the trainee mounted upon the representation of the horse 27 to move after the cattle and rope it. The distance between the cattle and the trainee along the path of travel may be varied at will by the operator and preferably in accordance with the trainee's ability to throw the rope. The speed at which the cattle moves may also be controlled independently of the speed at which the representation of the horse is caused to move. When the trainee ropes the cattle the operator may rapidly slow down the conveyors 23 and 23', simulating the action of cow pony in holding a steer that has been roped. Moreover, it will be noted that when the representation 16 of a cattle has been roped and the rope tightened, support 10 will hinge rearwardly, permitting such representation to be removed from the support and to fall upon the ground in a realistic manner.

Fig. 6 illustrates a modified form or arrangement capable of being used for temporary installations. As there shown a structural framework 50 capable of being placed upon the ground supports the driving means, pulleys and sprockets utilized in driving the conveying means. The framework 50 includes a vertically journaled shaft 51 carrying the sprocket wheel 52 and a crown gear 53 capable of being driven by a bevel gear 54 and variable speed drive 55 connected to motor 56, the other part of the framework comprising vertical shafts 57 and 57' carrying pulleys or sheaves 58 and 58', respectively, each of said shafts also including crown gears 59 and 59' driven by bevel gears 60 and 60' operably connected to variable speed drive 55' operated by the motor 56. A suitable cable or sprocket upon which the representation of the cattle is carried is therefore driven by sprocket of wheel 52; the parallel cables upon which a representation of a horse is carried are driven by pulleys or sheaves 58 and 58'. It will be understood that only one lay of each cable or chain is utilized, the arrangement shown in Fig. 6 being similar to that shown in Fig. 1 with the exception that both lays of a continuous conveyor are on the surface of the ground. The far end of an arrangement such as is shown in Fig. 6 simply comprises a structural framework in which sprockets, sheaves or pulleys are mounted on vertical axes and are capable of engaging and guiding the opposite ends of the conveyors driven by sprockets and pulleys 52, 58 and 58'.

In some instances and for more advanced students, it is desirable to use a real horse and to dispense with a representation of horse. Fig. 7 is a plan view of such an arrangement. As there shown, the driving unit may comprise a series of sprockets 70, 71 and 72 in close proximity to each other, these sprockets being mounted on vertical axes. The shaft of one of said sprockets may be connected to a suitable, controllable, variable speed driving means. A continuous chain 73 is driven by said arrangement of sprockets 70–72 and caused to travel a circuitous path by passing over guiding sprockets, such as 74, 75, 76, 77 and the like mounted upon vertical shafts. A representation of a cattle is carried by the continuous chain conveyor 73 and it will be noted that such representation may be caused to travel in a zig-zag or any other desired pattern by regulating the placement of the various guiding sprockets, such as 74, 75, etc. Since the cable or sprocket chain 73 extends virtually at ground level, the representation of a cattle carried by such chain may be caused to travel in a circuitous path exemplary of the erratic running of a run-away steer, permitting a horseman to actually chase such representation and experience the change of direction and evasive tactics which he would meet on the open range.

It is to be understood that the description given hereinabove is illustrative only. Instead of electric motors, gasoline, diesel, or other form of driving mechanism may be employed. Instead of variable speed drives of the type illustrated, other transmissions and arrangements including clutches, etc. may be used but since such modifications of driving means are within the skill of those in the art they are not described in detail. All changes and modifications coming within the scope of the appended claims are embraced thereby.

I claim:

1. A device for amusement and instruction in cattle roping comprising: a continuous conveyor including a lay virtually at ground level; a support hingedly connected to said conveyor for movement about an axis substantially transverse to the direction of movement of the conveyor; spring means normally biasing and holding said support in a vertical position; a three-dimensional representation of a cattle removably carried upon said support; a second continuous conveying means having an upper lay virtually at ground level adjacent to and extending in substantially parallel relation to said first conveyor; a representation of a horse securely carried by said conveying means, said horse representation being adapted to support a human being; and driving means for driving said first conveyor and said conveying means, said driving means including means for varying the relative speed of said conveying means and conveyor.

2. A device of the character stated in claim 1, wherein said second continuous conveying means comprises a pair of continuous cables in parallel relation, the upper lays of said cables being interconnected by a framework above ground level, said framework being adapted to carry the representation of a horse.

3. A device of the character stated in claim 1, wherein said means for driving said conveyor and conveying means comprises a single motor and means associated therewith for varying the speed of one of said conveyors with respect to the other.

4. A device of the character stated in claim 1, wherein the other lays of said conveyor and conveying means extend through conduits below ground level.

References Cited in the file of this patent

UNITED STATES PATENTS

| 1,287,176 | Armstrong | Dec. 10, 1918 |
| 1,533,795 | Foans | Apr. 14, 1925 |
| 2,439,104 | Sandell | Apr. 6, 1948 |
| 2,661,953 | Campbell | Dec. 8, 1953 |

FOREIGN PATENTS

| 455,464 | Canada | Mar. 29, 1949 |